US008858746B2

(12) United States Patent
Ishihara et al.

(10) Patent No.: US 8,858,746 B2
(45) Date of Patent: *Oct. 14, 2014

(54) MANUFACTURING METHOD FOR LAMINATED CERAMIC CAPACITOR, AND LAMINATED CERAMIC CAPACITOR

(75) Inventors: Masayuki Ishihara, Nagaokakyo (JP); Yosuke Hirata, Nagaokakyo (JP); Hideaki Tsuji, Nagaokakyo (JP)

(73) Assignee: Murata Manufacturing Co., Ltd., Nagaokakyo-Shi, Kyoto-Fu (JP)

( * ) Notice: Subject to any disclaimer, the term of this patent is extended or adjusted under 35 U.S.C. 154(b) by 261 days.

This patent is subject to a terminal disclaimer.

(21) Appl. No.: 13/372,582

(22) Filed: Feb. 14, 2012

(65) Prior Publication Data
US 2012/0140376 A1    Jun. 7, 2012

Related U.S. Application Data

(63) Continuation of application No. PCT/JP2010/062212, filed on Jul. 21, 2010.

(30) Foreign Application Priority Data

Aug. 20, 2009  (JP) ................................. 2009-190715

(51) Int. Cl.
C03B 29/00    (2006.01)
H01G 4/12    (2006.01)
H01G 13/00   (2013.01)

(52) U.S. Cl.
CPC .............. H01G 4/1227 (2013.01); H01G 13/00 (2013.01)
USPC ................... 156/89.11; 156/89.12; 156/89.16

(58) Field of Classification Search
USPC ............... 156/89.16, 89.12, 89.11; 361/301.4
See application file for complete search history.

(56) References Cited

U.S. PATENT DOCUMENTS 4,490,319 A * 12/1984 Lee et al. ...................... 264/603
5,260,094 A * 11/1993 Giannelis et al. ............... 427/79
5,391,339 A *  2/1995 Wei et al. ...................... 264/666

(Continued)

FOREIGN PATENT DOCUMENTS

CN         1510718 A     7/2004
CN       101346784 A     1/2009

(Continued)

OTHER PUBLICATIONS

PCT/JP2010/062212 Written Opinion dated Sep. 16, 2010.

*Primary Examiner* — Philip Tucker
*Assistant Examiner* — Alex Efta
(74) *Attorney, Agent, or Firm* — Dickstein Shapiro LLP

(57) ABSTRACT

A method of manufacturing a laminated body in a raw state for a laminated ceramic capacitor, which includes dielectric ceramic layers containing a dielectric ceramic raw material powder for and internal electrodes, in which a heat treatment is carried out in accordance with a temperature profile in which the average rate of temperature rise is 40° C./second or more from room temperature to a maximum temperature. The dielectric ceramic raw material powder contains a $BaTiO_3$ system as its main constituent and contains Re (Re is at least one selected from Sc, Y, La, Ce, Pr, Nd, Pm, Sm, Eu, Gd, Tb, Dy, Ho, Er, Tm, Yb, and Lu) as an accessory constituent, in which the content of Re is 0.3 to 3 parts by mol with respect to 100 parts by mol of the main constituent.

7 Claims, 1 Drawing Sheet

(56) References Cited

U.S. PATENT DOCUMENTS

| | | | |
|---|---|---|---|
| 5,548,475 A * | 8/1996 | Ushikubo et al. | 361/321.4 |
| 5,650,362 A * | 7/1997 | Nashimoto | 427/126.3 |
| 5,814,923 A * | 9/1998 | Shimada | 310/311 |
| 8,540,832 B2 * | 9/2013 | Hirata et al. | 156/89.11 |
| 2004/0224188 A1 | 11/2004 | Kijima et al. | |
| 2007/0135295 A1 * | 6/2007 | Sasabayashi et al. | 501/138 |
| 2008/0266751 A1 | 10/2008 | Yamazaki et al. | |
| 2009/0176345 A1 | 7/2009 | Saita | |
| 2013/0222973 A1 * | 8/2013 | Wada et al. | 361/321.2 |

FOREIGN PATENT DOCUMENTS

| | | |
|---|---|---|
| CN | 101399092 A | 4/2009 |
| JP | 11-163273 A | 6/1999 |
| JP | 2000-216042 A | 8/2000 |
| JP | 2001-302342 A | 10/2001 |
| JP | 2008-226941 A | 9/2008 |
| KR | 10-2006-0135249 | 12/2006 |
| WO | WO-2007-013604 A1 | 2/2007 |

* cited by examiner

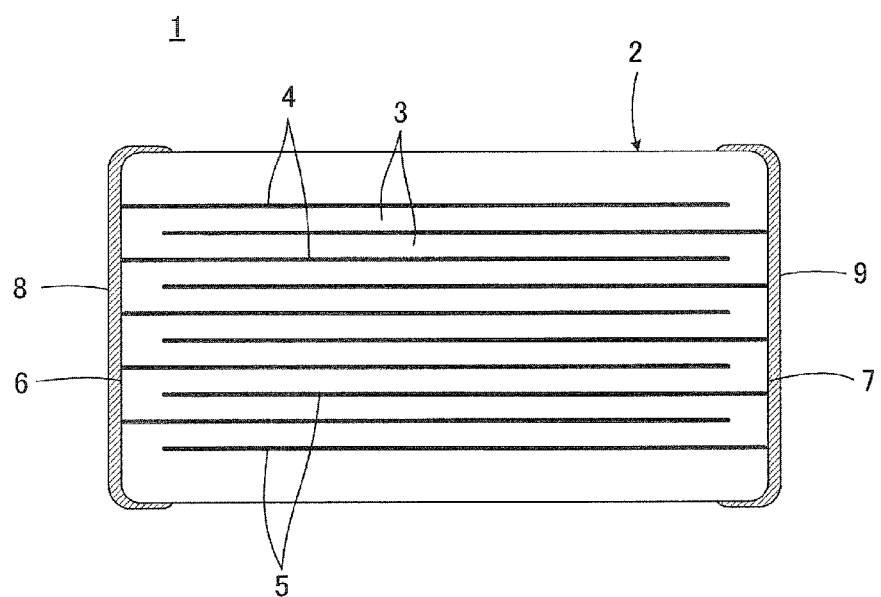

MANUFACTURING METHOD FOR LAMINATED CERAMIC CAPACITOR, AND LAMINATED CERAMIC CAPACITOR

CROSS REFERENCE TO RELATED APPLICATIONS

The present application is a continuation of International application No. PCT/JP2010/062212, filed Jul. 21, 2010, which claims priority to Japanese Patent Application No. 2009-190715, filed Aug. 20, 2009, the entire contents of each of which are incorporated herein by reference.

FIELD OF THE INVENTION

This invention relates to a method for manufacturing a laminated ceramic capacitor and the laminated ceramic capacitor, and more particularly, an improvement of a firing condition in a method for manufacturing a laminated ceramic capacitor, and an improvement in the composition of a $BaTiO_3$ based dielectric ceramic for use in a laminated ceramic capacitor which is suitable for the improved firing condition.

BACKGROUND OF THE INVENTION

In laminated ceramic capacitors, for the purpose of reduction in size (reduction in thickness), it is effective to attempt to reduce in thickness not only of dielectric ceramic layers, but also of internal electrodes. However, when the internal electrodes are further reduced in thickness, electrode disconnection is likely to be caused as a result of a firing step for sintering of a raw laminated body. For example, the following technique has been proposed as a technique which can prevent the electrode disconnection.

In Japanese Patent Laid-Open Publication No. 2008-226941 (Patent Document 1), the rate of temperature rise adjusted to 500° C./hour to 5000° C./hour in a firing step prevents electrode disconnection to achieve an electrode thickness of 0.8 to 1 μm.

In Japanese Patent Laid-Open Publication No. 2000-216042 (Patent Document 2), structural defects such as cracks are prevented to increase the reliability of a laminated ceramic capacitor obtained, in such a way that the rate of temperature rise is adjusted to 500° C./hour or more at 700° C. to 1100° C. in a temperature rising process for firing, the oxygen partial pressure in the atmosphere is adjusted to $10^{-8}$ atm or less at 1100° C. or more, and the oxygen partial pressure is adjusted to $10^{-8}$ atm or more partially at 1100° C. or less in a temperature falling process.

In Korean Patent Laid-Open Publication No. 10-2006-0135249 (Patent Document 3), the temperature is increased at a rate of temperature rise of 10° C./second up to a temperature 20° C. lower than the maximum temperature to achieve a balance between the prevention of electrode disconnection and the prevention of overshoot during the temperature rise (reaching a temperature higher than a desired firing temperature during the temperature rise).

While the prior art described in any of Patent Documents 1 to 3 achieves the effect of allowing the internal electrodes to be reduced in layer thickness by means such as increasing the rate of temperature rise, the effect has a limitation, and for example, in a laminated ceramic capacitor including internal electrodes containing Ni as a conductive component, it is extremely difficult to achieve 0.3 μm or less as an electrode thickness after firing.

In addition, the atmosphere for firing a raw laminated body including internal electrodes using a base metal as a conductive component is, for example, a $N_2/H_2/H_2O$ system which needs to be controlled on a more reducing side than a Ni/NiO equilibrium oxygen partial pressure, and this need will restrict the equipment and the material design.

In addition, when the ceramic contains, for example, a volatile component such as Li, this volatile component is likely to scatter during firing. Further, the residual volume of the volatile component is likely to vary depending on the size of the raw laminated body to be fired, that is, the chip size, and the amount of charging a firing furnace, and it is difficult to suppress the variation in this residual volume.

On the other hand, a ceramic containing a $BaTiO_3$ system as its main constituent has been typically used as a dielectric ceramic constituting dielectric ceramic layers included in laminated ceramic capacitors. Further, the ceramic containing the $BaTiO_3$ system as its main constituent preferably contains a rare-earth element Re (Re is at least one selected from Sc, Y, La, Ce, Pr, Nd, Pm, Sm, Eu, Gd, Tb, Dy, Ho, Er, Tm, Yb, and Lu) as an accessory constituent, mainly for the improvement of reliability.

However, the Re fails to improve the reliability sufficiently, unless the Re is present as a solid solution moderately in the main constituent grains. It is to be noted in this case that the Re that is present as a solid solution does not always have to be present as a solid solution in the entire main constituent grains, and for example, may be present as a solid solution to such an extent that a core-shell structure is formed.

Therefore, when a lot of thermal energy is applied in order to make the Re present moderately as a solid solution, the solid solubility of the Re is improved, while the segregation of the Re is also increased, thereby leading to a decrease in reliability in the case of a thin layer of a laminated ceramic capacitor.

In addition, when the content of Re is increased significantly, there is a possibility that the dielectric constant of the dielectric ceramic will be decreased.

Patent Document 1: Japanese Patent Laid-Open Publication No. 2008-226941
Patent Document 2: Japanese Patent Laid-Open Publication No. 2000-216042
Patent Document 3: Korean Patent Laid-Open Publication No. 10-2006-0135249

SUMMARY OF THE INVENTION

Therefore, an object of the present invention is to provide a method for manufacturing a laminated ceramic capacitor, and the laminated ceramic capacitor, which can solve the problems described above.

This invention is first directed to a method for manufacturing a laminated ceramic capacitor, which includes: a step of preparing a raw laminated body including a plurality of stacked dielectric ceramic layers containing a raw material powder for dielectric ceramic, and internal electrodes formed along the specific interfaces between the dielectric ceramic layers; and a firing step of subjecting the raw laminated body to a heat treatment in order to carry out sintering of the raw laminated body, and characteristically has the following configuration in order to solve the technical problems described above.

More specifically, in this invention, a temperature profile in which the average rate of temperature rise is 40° C./second or more from room temperature to a maximum temperature is adopted in the firing step. Further, in order for the composition of the raw material powder for dielectric ceramic to be suitable for this high-rate temperature rise, the following composition is adopted.

The raw material powder for dielectric ceramic contains $ABO_3$ (A necessarily contains Ba, and may further contain at least one of Ca and Sr; and B necessarily contains Ti, and may further contain at least one of Zr and Hf) as its main constituent, and contains Re (Re is at least one selected from Sc, Y, La, Ce, Pr, Nd, Pm, Sm, Eu, Gd, Tb, Dy, Ho, Er, Tm, Yb, and Lu) as an accessory constituent. Further, the content of Re is 0.3 to 3 parts by mol with respect to 100 parts by mol of the main constituent.

In the method for manufacturing a laminated ceramic capacitor according to this invention, the firing step is preferably carried out in accordance with a temperature profile in which the average rate of temperature rise is 100° C./second or more from room temperature to the maximum temperature.

In addition, the content of Re is preferably 0.3 to 1 part by mol with respect to 100 parts by mol of the main constituent.

This invention is also directed to a laminated ceramic capacitor including: a laminated body configured by a plurality of dielectric ceramic layers stacked, and a plurality of internal electrodes formed along the specific interfaces between the dielectric ceramic layers; and a plurality of external electrodes formed in different positions from each other on the outer surface of the laminated body and electrically connected to specific one of the internal electrodes.

In the laminated ceramic capacitor according to this invention, the dielectric ceramic layers are composed of a dielectric ceramic containing $ABO_3$ (A necessarily contains Ba, and may further contain at least one of Ca and Sr; and B necessarily contains Ti, and may further contain at least one of Zr and Hf) as its main constituent, and containing Re (Re is at least one selected from Sc, Y, La, Ce, Pr, Nd, Pm, Sm, Eu, Gd, Tb, Dy, Ho, Er, Tm, Yb, and Lu) as an accessory constituent, in which the content of Re is 0.3 to 3 parts by mol with respect to 100 parts by mol of the main constituent, and the standard deviation of the Re contained in terms of parts by mol is 0.3 or less with respect to 100 parts by mol of the main constituent at grain boundaries in the dielectric ceramic constituting the dielectric ceramic layers.

In accordance with the method for manufacturing a laminated ceramic capacitor according to this invention, the predetermined amount of Re which has an action of improvement in reliability is contained in the dielectric ceramic layers, and sintering is completed in a short period of time in the firing step. Thus, the segregation of the Re can be prevented as much as possible from being caused in the dielectric ceramic layers, so that the Re can be made present as a solid solution uniformly in the main constituent grains. Therefore, characteristics as an indication of reliability, such as, for example, characteristics in high temperature loading can be improved in the laminated ceramic capacitor, without leading to a decrease in dielectric constant in the ceramic layers.

In addition, in accordance with the manufacturing method according to this invention, in the internal electrodes, changes in state such as electrode disconnection and ball formation are prevented during the heat treatment in the firing step, and the internal electrodes can be thus progressively reduced in layer thickness while maintaining the coverage of the internal electrodes at a high level, thereby making a contribution to the reduction in size of and the increase in capacitance of the laminated ceramic capacitor.

In addition, the reduced layer thickness and increased coverage for the internal electrodes are produced as a result of preventing the internal electrodes from being shrunk, and voids, gaps, and the like at the ends of the internal electrodes can be thus also prevented from being caused at the same time. Therefore, the sealing property of the laminated body is improved after the heat treatment, and the reliability of environment resistance can be also improved as a laminated ceramic capacitor.

In addition, the shrinkage of the internal electrodes is prevented as described above, and thus, in the case of extracting the internal electrodes to a predetermined surface of the laminated body, the degree of recess will be quite low at the extracted ends of the internal electrodes. In addition, sintering is completed in a short period of time in the firing step, and thus, almost no movement or segregation of the glass phase onto the surface will be caused due to the additive component to the ceramic constituting the dielectric ceramic layers. Therefore, the step for exposing the extracted ends of the internal electrodes can be skipped in the formation of external electrodes electrically connected to the internal electrodes.

In addition, even when the dielectric ceramic constituting the dielectric ceramic layers contains volatile components (sintering aids) such as Li, B, and Pb, the volatile components is prevented from being scattered by the heat treatment in the firing step, because sintering is completed in a short period of time in the firing step. As a result, the residual volume of the volatile components can be prevented from varying depending on changes in the size of the laminated body and the amount of charging a firing furnace.

In addition, in the case of the laminated ceramic capacitor including internal electrodes containing, as a conductive component, a base metal such as Ni, there is conventionally a need in the heat treatment step to precisely control the oxygen partial pressure in the atmosphere to near the equilibrium oxygen partial pressure of the base metal in order to achieve a balance between the prevention of the internal electrodes from being oxidized and the prevention of the ceramic from being reduced, and this need complicates the design of a firing furnace. In contrast, according to this invention, the high rate of temperature rise in the firing step can reduce the time for the heat treatment (ceramic sintering shrinkage), and thus, even in a more oxidizing atmosphere than the equilibrium oxygen partial pressure of the base metal, the heat treatment can be carried out almost without oxidation. Therefore, a laminated ceramic capacitor with high reliability can be manufactured which has the dielectric ceramic less likely to be reduced and requires no reoxidation treatment.

BRIEF DESCRIPTION OF THE DRAWINGS

FIG. 1 is a cross-sectional view schematically illustrating a laminated ceramic capacitor produced by a manufacturing method according to an embodiment of this invention.

DETAILED DESCRIPTION OF THE INVENTION

With reference to FIG. 1, the structure of a laminated ceramic capacitor 1 will be described to which this invention is applied.

The laminated ceramic capacitor 1 includes a laminated body 2 as a component main body. The laminated body 2 includes a plurality of dielectric ceramic layers 3 stacked, and a plurality of internal electrodes 4 and 5 formed along the specific interfaces between the dielectric ceramic layers 3. One and the other end surfaces 6 and 7 of the laminated body 2 respectively have exposed ends of the plurality of internal electrodes 4 and 5, and external electrodes 8 and 9 are formed respectively so as to electrically connect the respective ends of the internal electrodes 4 to each other and the respective ends of the internal electrodes 5 to each other.

For the manufacture of this laminated ceramic capacitor 1, the laminated body 2 in a raw state is first prepared by a well known method such as stacking ceramic green sheets with the internal electrodes 4 and 5 printed thereon. Then, a firing step is carried out for sintering of the raw laminated body. Then, the external electrodes 8 and 9 are formed respectively on the end surfaces 6 and 7 of the sintered laminated body 2 to complete the laminated ceramic capacitor 1.

In this invention, a powder which has the following composition is used as a raw material powder for dielectric ceramic, which is included in the ceramic green sheets to serve as the dielectric ceramic layers 3 included in the laminated body 2 described above.

More specifically, the raw material powder for dielectric ceramic contains $ABO_3$ (A necessarily contains Ba, and may further contain at least one of Ca and Sr; and B necessarily contains Ti, and may further contain at least one of Zr and Hf) as its main constituent, and contains Re (Re is at least one selected from Sc, Y, La, Ce, Pr, Nd, Pm, Sm, Eu, Gd, Tb, Dy, Ho, Er, Tm, Yb, and Lu) as an accessory constituent. Further, the content of Re is 0.3 to 3 parts by mol with respect to 100 parts by mol of the main constituent.

If the content of Re is as low as less than 0.3 part by mol with respect to 100 parts by mol of the main constituent in the composition mentioned above, the solid solubility of Re in main constituent grains will be insufficient, the Re effect of improvement in reliability will be thus insufficient, and as a result, the failure rate will be increased in a high temperature load life test. On the other hand, the content of Re greater than 3 parts by mol leads to a decrease in the dielectric constant of the dielectric ceramic. It is to be noted that the increased content of Re tends to further decrease the dielectric constant, and the content of Re thus preferably has an upper limit of 1 part by mol.

In addition, in the firing step described above, a heat treatment step of applying a temperature profile in which the average rate of temperature rise is 40° C./second or more from room temperature to the maximum temperature is carried out according to this invention. Preferably, the temperature profile is adjusted to 100° C./second or more.

The raw laminated body is preferably subjected to a degreasing treatment before the heat treatment step.

In addition, after reaching the maximum temperature, cooling is preferably carried out immediately without keeping the temperature in the heat treatment step.

When the laminated ceramic capacitor 1 is manufactured by applying the high rate of temperature rise as described above while using the raw material powder for dielectric ceramic, which has the composition as described previously, the standard deviation of Re contained in terms of parts by mol can be adjusted to 0.3 or less with respect to 100 parts by mol of the main constituent at grain boundaries in the dielectric ceramic constituting the dielectric ceramic layers 3. This standard deviation means almost no Re segregation is caused, which contributes to a reduction of variation in the reliability of the laminated ceramic capacitor 1.

It is to be noted that while the laminated ceramic capacitor 1 shown is a two-terminal type laminated ceramic capacitor including the two external electrodes 8 and 9, this invention can be also applied to multi-terminal type laminated ceramic capacitors.

An experimental example will be described below which was carried out for confirming the effects of this invention.

Preparation of Raw Material Powder for Dielectric Ceramic

First, a $BaTiO_3$ powder was prepared as a ceramic powder for a main constituent.

Next, 0.6 part by mol of a MnO powder, 0.6 part by mol of a MgO powder, and 1.0 part my mol of a $SiO_2$ powder were each weighed and added with respect to 100 parts by mol of the $BaTiO_3$ powder, with the addition of Re shown in the column "Type" in the "Re" of Table 1 likewise in the additive amount shown in the column "Additive Amount" thereof, and these blended materials were mixed in a ball mill for 24 hours, and then dried to obtain a raw material powder for dielectric ceramic.

(B) Preparation of Laminated Ceramic Capacitor

The raw material powder for dielectric ceramic obtained with the addition of a polyvinyl butyral based binder and ethanol was subjected to wet mixing in a ball mill for 24 hours to prepare a ceramic slurry.

Next, this ceramic slurry was formed into the shape of a sheet in accordance with a doctor blade method to obtain rectangular ceramic green sheets.

Next, a conductive paste containing Ni as its main constituent was applied by screen printing onto the ceramic green sheets, thereby forming conductive paste films to serve as internal electrodes.

Next, the multiple ceramic green sheets with the conductive paste films formed were stacked so that the sides were alternated to which the conductive paste films were extracted, thereby providing a raw laminated body.

Next, the raw laminated body was heated to a temperature of 700° C. in an $N_2$ atmosphere to burn the binder, then subjected to a heat treatment of increasing the temperature to the "Maximum Temperature" in Table 1 at the "Rate of Temperature Rise" shown in Table 1, and immediately cooled without keeping at the "Maximum Temperature", thereby providing a sintered laminated body. The "Oxygen Partial Pressure" at the "Maximum Temperature" was adjusted as shown in Table 1. It is to be noted that the terms "E-09" and "E-08" in the indication of the "Oxygen Partial Pressure" respectively refer to $10^{-9}$ and $10^{-8}$.

Next, a Cu paste containing a $B_2O_3$—$Li_2O$—$SiO_2$—BaO glass frit was applied to both end surfaces of the sintered laminated body, and fired at a temperature of 800° C. in an $N_2$ atmosphere to form external electrodes electrically connected to the internal electrodes, thereby providing laminated ceramic capacitors as samples.

The laminated ceramic capacitors thus obtained had outside dimensions of 0.5 mm in width, 1.0 mm in length, and 1.0 mm in thickness, the dielectric ceramic layers interposed between the internal electrodes had a thickness of 1.0 μm, and the internal electrodes had a thickness of 0.3 μm. In addition, the number of effective dielectric ceramic layers was 50, and the area of the electrode opposed per dielectric ceramic layer was 0.3 $mm^2$.

(C) Evaluation of Characteristics

The laminated ceramic capacitors obtained were evaluated for dielectric constant ∈, the number of failures in a high temperature load life test, and m value (variation) in a high temperature load life test, as shown in Table 1.

The dielectric constant ∈ calculated from electrostatic capacitance was measured under the conditions of a temperature: 25° C.; 120 Hz; and 0.5 Vrms.

In addition, for the number of failures in a high temperature load life test, 100 samples were subjected to a high temperature load life test in which a voltage of 10 V (for an electric field intensity of 10 kV/mm) was applied at a temperature of 105° C., and the sample was determined as a defective if the insulation resistance value was decreased to 200 kΩ or less before a lapse of 1000 hours, thereby obtaining the number of detectives.

In addition, the m value in a high temperature load life test is intended to evaluate the variation in reliability, which is calculated from a Weibull plot obtained by carrying out an accelerated test for high temperature load life under the severer conditions of a temperature: 150° C. and a voltage: 16 V than the conditions in the high temperature load life test described above. The larger m value is evaluated as smaller variation in reliability. It is to be noted that the number of samples tested was 20.

(D) Evaluation on Compositions in Grain and at Grain Boundary

As shown in Table 1, the capacitors were evaluated for the distance of Re solid solubility in grains and the standard deviation of the content of Re at grain boundaries.

The distance of Re solid solubility in grains was obtained, in such a way that cross sections of the dielectric ceramic layers in the laminated ceramic capacitors according to each sample were observed in a field including around 20 crystal grains under a TEM. More specifically, an EDX elemental analysis was carried out in a grain at intervals of 2 nm from the grain boundary toward the center of the grain, and the distance from the point of a detection limit or less to the grain boundary was determined as the distance of Re solid solubility. This measurement was carried out for 5 grains in one field, and further, this measurement was carried out for 5 fields. More specifically, the measurement was carried out for 25 grains in total. The average values are shown in Table 1.

The standard deviation of the content of Re at grain boundaries was obtained from the standard deviation of the Re content (in parts by mol with respect to 100 parts by mol of the main constituent) at the 25 points of grain boundaries in total.

In Table 1, the samples numbered with a symbol of * correspond to samples outside the scope of this invention.

Samples 14 to 17 and 19 to 28 within the scope of this invention exhibited a high value of $\in$ greater than 2000, achieved a relatively small standard deviation for the Re content at grain boundaries, and thus relatively small variation in the Re content at the grain boundaries, achieved 0 for the number of failures in the high temperature load life test, and achieved a relatively large m value in the high temperature load life test, and thus small variation in reliability.

When comparisons are made among samples 14 to 17 and 19 to 28 within the scope of this invention, the smaller additive amount of Re achieves higher $\in$.

In contrast to these sample, samples 1, 2, 12, and 13 outside the scope of this invention achieved $\in$ of 2000 or less, because of the additive amount of Re greater than 3 parts by mol.

In addition, samples 3 to 11 achieved, because of the rate of temperature rise less than 40° C./second, a relatively large standard deviation for the Re content at grain boundaries, thereby resulting in the increased number of failures in the high temperature load life test. In addition, the m value was relatively small in the high temperature load life test.

In addition, for sample 18, because of the low additive amount of R less than 0.3 part by mol, the number of failures was relatively large in the high temperature load life test.

It is to be noted that while $BaTiO_3$ was used as the main constituent ABO3 in the raw material powder for dielectric ceramic in the experimental example, it has been confirmed that a similar effect is produced even in the case of using a main constituent in which some of Ba at the A site is substituted with at least one of Ca and Sr, or even in the case of using

TABLE 1

| Sample number | $\epsilon$ | Maximum temperature (° C.) | Oxygen partial pressure (MPa) | Rate of temperature rise (° C./second) | Re Type | Re Additive amount (Parts by mol) | Distance of Re solid solubility in grain (nm) | Standard deviation of the content of Re at grain boundary (Parts by mol) | Number of failures in the high temperature load life test | m value in a high temperature load life test |
|---|---|---|---|---|---|---|---|---|---|---|
| *1 | 1620 | 1240 | 4.43E-09 | 1 | Dy | 6 | 32 | 0.51 | 0 | 2.1 |
| *2 | 1920 | 1240 | 4.43E-09 | 1 | Dy | 4 | 26 | 0.5 | 0 | 1.9 |
| *3 | 2200 | 1220 | 2.88E-09 | 1 | Dy | 3 | 22 | 0.43 | 1 | 1.8 |
| *4 | 2620 | 1200 | 1.78E-09 | 1 | Dy | 2 | 18 | 0.42 | 3 | 2.2 |
| *5 | 2890 | 1180 | 1.01E-09 | 1 | Dy | 1 | 10 | 0.4 | 11 | 2.5 |
| *6 | 3240 | 1180 | 1.01E-09 | 1 | Dy | 0.3 | 4 | 0.51 | 85 | 2.8 |
| *7 | 3520 | 1180 | 1.01E-09 | 1 | Dy | 0.1 | not detectable | — | 100 | 3.1 |
| *8 | 2860 | 1180 | 1.01E-09 | 5 | Dy | 1 | 10 | 0.41 | 11 | 2.4 |
| *9 | 2850 | 1180 | 1.01E-09 | 10 | Dy | 1 | 12 | 0.35 | 12 | 3.6 |
| *10 | 2830 | 1220 | 2.88E-09 | 20 | Dy | 1 | 12 | 0.36 | 8 | 3.4 |
| *11 | 2830 | 1220 | 2.88E-09 | 30 | Dy | 1 | 14 | 0.32 | 2 | 4.1 |
| *12 | 1510 | 1320 | 2.95E-08 | 40 | Dy | 6 | 38 | 0.25 | 0 | 4.2 |
| *13 | 1830 | 1320 | 2.95E-08 | 40 | Dy | 4 | 30 | 0.23 | 0 | 5.1 |
| 14 | 2100 | 1300 | 1.90E-08 | 40 | Dy | 3 | 26 | 0.19 | 0 | 5.8 |
| 15 | 2530 | 1300 | 1.90E-08 | 100 | Dy | 1 | 22 | 0.14 | 0 | 5.5 |
| 16 | 2810 | 1260 | 7.44E-09 | 40 | Dy | 1 | 16 | 0.14 | 0 | 6.2 |
| 17 | 3090 | 1260 | 7.44E-09 | 40 | Dy | 0.3 | 8 | 0.16 | 0 | 4.8 |
| *18 | 3320 | 1260 | 7.44E-09 | 100 | Dy | 0.1 | 4 | 0.18 | 10 | 5.1 |
| 19 | 2780 | 1260 | 7.44E-09 | 100 | Ho | 1 | 14 | 0.18 | 0 | 5.9 |
| 20 | 2750 | 1260 | 7.44E-09 | 100 | Sc | 1 | 16 | 0.17 | 0 | 6.4 |
| 21 | 2670 | 1260 | 7.44E-09 | 100 | Y | 1 | 14 | 0.16 | 0 | 5.6 |
| 22 | 2850 | 1260 | 7.44E-09 | 100 | Gd | 1 | 18 | 0.14 | 0 | 4.9 |
| 23 | 2760 | 1260 | 7.44E-09 | 100 | Er | 1 | 14 | 0.13 | 0 | 7.2 |
| 24 | 2650 | 1260 | 7.44E-09 | 100 | Yb | 1 | 12 | 0.15 | 0 | 4.1 |
| 25 | 2600 | 1260 | 7.44E-09 | 100 | Tb | 1 | 12 | 0.18 | 0 | 4.7 |
| 26 | 2640 | 1260 | 7.44E-09 | 100 | Tm | 1 | 14 | 0.14 | 0 | 5 |
| 27 | 2710 | 1260 | 7.44E-09 | 100 | Lu | 1 | 10 | 0.2 | 0 | 6.8 |
| 28 | 2610 | 1260 | 7.44E-09 | 100 | Dy, Y | 0.5, 0.5 | 10 | 0.19 | 0 | 5.9 | a main constituent in which some of Ti at the B site is substituted with at least one of Zr and Hf.

DESCRIPTION OF REFERENCE SIGNS 1 laminated ceramic capacitor
2 laminated body
3 dielectric ceramic layer
4, 5 internal electrode
8, 9 external electrode

The invention claimed is:

1. A method for manufacturing a laminated ceramic capacitor, the method comprising:
preparing a raw laminated body including a plurality of stacked dielectric ceramic layers containing a raw material dielectric ceramic powder, and internal electrodes formed along specific interfaces between the dielectric ceramic layers; and
subjecting the raw laminated body to a heat treatment in accordance with a temperature profile in which an average rate of temperature rise is 40° C./second or more from room temperature to a maximum temperature so as to sinter the raw laminated body, wherein
the raw material dielectric ceramic powder contains $ABO_3$ as a main constituent thereof, and contains Re as an accessory constituent thereof, and a content of Re is 0.3 to 3 parts by mol with respect to 100 parts by mol of the main constituent,
wherein A contains at least Ba, and B contains at least Ti, and
wherein Re is at least one element selected from the group consisting of Sc, Y, La, Ce, Pr, Nd, Pm, Sm, Eu, Gd, Tb, Dy, Ho, Er, Tm, Yb, and Lu.

2. The method for manufacturing a laminated ceramic capacitor according to claim 1, wherein A further contains at least one of Ca and Sr.

3. The method for manufacturing a laminated ceramic capacitor according to claim 2, wherein B further contains at least one of Zr and Hf.

4. The method for manufacturing a laminated ceramic capacitor according to claim 1, wherein B further contains at least one of Zr and Hf.

5. The method for manufacturing a laminated ceramic capacitor according to claim 1, wherein the heat treatment is carried out in accordance with a temperature profile in which the average rate of temperature rise is 100° C./second or more from room temperature to the maximum temperature.

6. The method for manufacturing a laminated ceramic capacitor according to claim 1, wherein the content of Re is 0.3 to 1 part by mol with respect to 100 parts by mol of the main constituent.

7. The method for manufacturing a laminated ceramic capacitor according to claim 1, wherein, after reaching the maximum temperature, cooling is carried out immediately.

* * * * *